INVENTOR.
DAVID R. STEINBERG

Feb. 18, 1969  D. R. STEINBERG  3,427,881
SYSTEM FOR MEASURING TEMPERATURE
Filed Oct. 25, 1966

*INVENTOR.*
DAVID R. STEINBERG
BY
ATTORNEY

United States Patent Office 3,427,881
Patented Feb. 18, 1969

3,427,881
SYSTEM FOR MEASURING TEMPERATURE
David R. Steinberg, Raleigh, N.C., assignor to Corning Glass Works, Corning, N.Y., a corporation of New York
Filed Oct. 25, 1966, Ser. No. 589,367
U.S. Cl. 73—339                                                  10 Claims
Int. Cl. G01k *11/26*

ABSTRACT OF THE DISCLOSURE

A high temperature measuring system having an ultrasonic resonant cavity oscillator as a temperature sensor. A gas maintained at a constant pressure is conducted through the high temperature region to the resonant cavity oscillator. High frequency sound waves generated by the oscillator travel to a microphone located remote from the oscillator which produces an electrical signal, the frequency of which is related to the temperature of the region.

---

Figure 1:
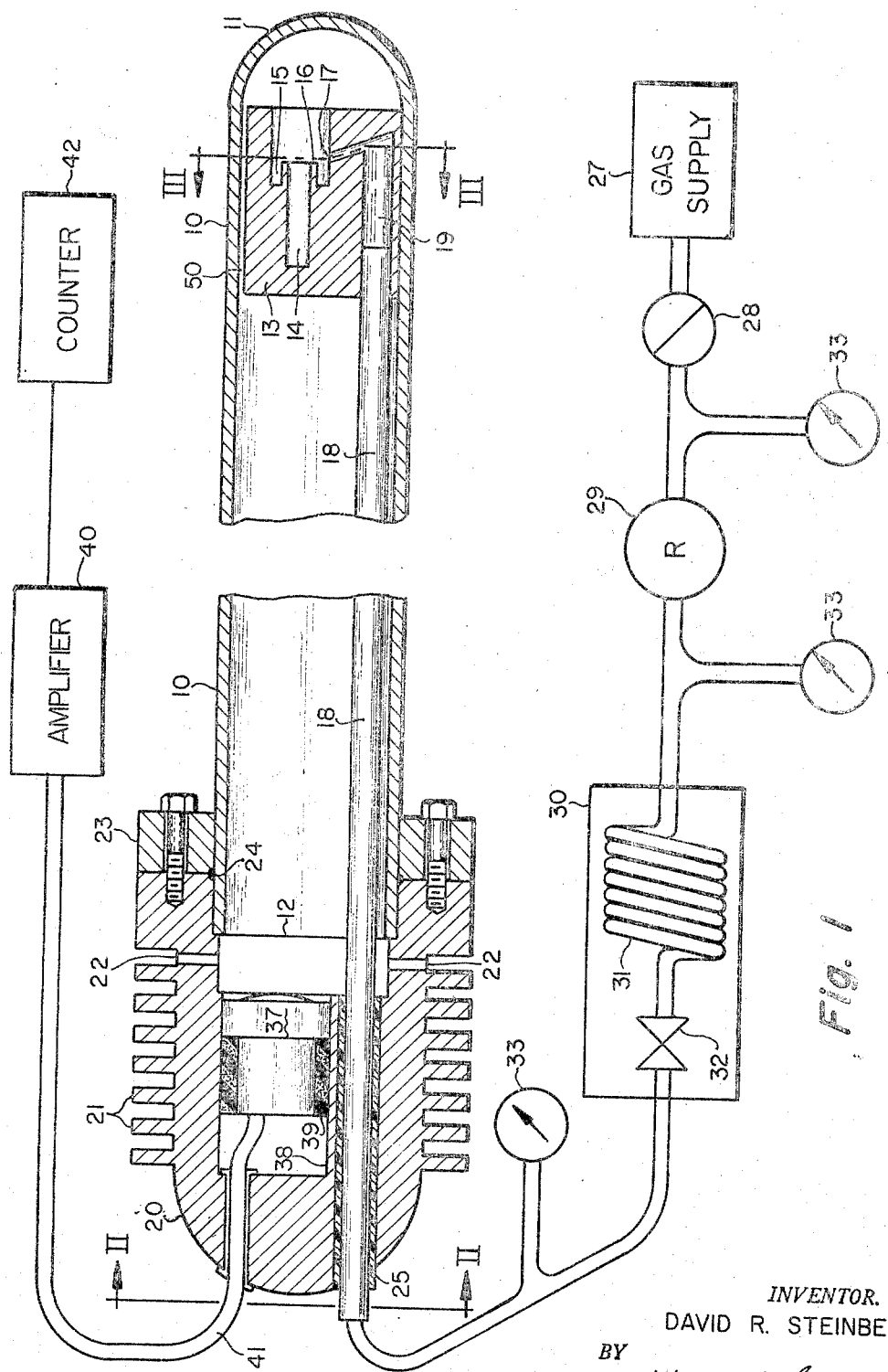

This invention relates generally to temperature sensing devices and more particularly to an accurate temperature sensor which utilizes a resonant cavity sonic oscillator, the frequency of which increases with increasing temperature.

There are an increasing number of industrial processes which require the accurate measurement of temperatures in the range of 1000° to 2000° C. One of the main problems encountered in the measurement of temperatures in this range is the decalibration of the temperature probe with time. Thermocouples, which have long been used to measure temperatures in this region, become unreliable after being used for long periods of time. Furthermore, some temperature sensors become unreliable due to erosion and corrosion of the sensor element by high temperatures, and many sensors exhibit an excessive time lag between the time of insertion thereof in a high temperature region and the registration of the correct temperature. Some high temperature sensors are also sensitive to electromagnetic radiation which may be produced by heat sources such as induction furnaces.

The present invention overcomes the above limitations of the prior art by utilizing a resonant cavity which produces sonic vibrations when a gas is passed thereover. The frequency of the vibrations produced by the cavity is proportional to the temperature of the gas.

It is well known that the frequency produced by a gas driven resonant cavity is proportional to the square root of the absolute temperature of the gas. Various sensors have been devised whereby the frequency of the vibrations produced by such gas is detected in order to determine characteristics of the gas such as its temperature, flow rate and composition.

In some conventional temperature sensors the gas, the temperature of which is to be determined, is already in motion. Such flowing gases exist in turbines, jet motors and the like. In other similar temperature sensing devices ambient gas in the high temperature region is drawn over a resonant cavity by subjecting the area in the region of the cavity to a low pressure. In such devices the pressure of the gas moving past the cavity cannot be accurately controlled. Furthermore, the sonic to electrical energy transducer in this type of sensor is generally located in a relatively high temperature region since the hot gas flows past the transducer.

It is therefore an object of this invention to provide a temperature sensing device on which the effects of aging are non-existent or negligible.

Another object of this invention is to provide a highly accurate temperature sensor having a simple design which can easily be constructed with high temperature materials.

Another object is to provide a temperature sensor for use in measuring temperatures over a wide band of high temperatures, e.g., between 1000° and 2000° C.

Another object is to provide a sensor of high temperatures having long term accuracy and reliability.

Another object is to provide a temperature sensor having a digital output signal which makes it especially useful in in-line digital process control.

Another object is to provide a temperature sensor which is not affected by electromagnetic radiation.

The above objects are attained by utilizing a supersonic resonant cavity oscillator as a temperature sensor. The resonant cavity is enclosed in one end of an elongated tube which is constructed of a high temperature, low expansion material. A precisely regulated flow of gas is conducted along the elongated protection tube and is directed toward an edge of the resonant cavity. The high frequency sound waves generated by this process travel through the tube to a microphone which is located at the end thereof opposite the resonant cavity. There the sound waves are converted into an electrical signal which is amplified and coupled to a counter circuit, the output of which is indicative of the temperature in the region in which the resonant cavity has been placed.

Figure 2:
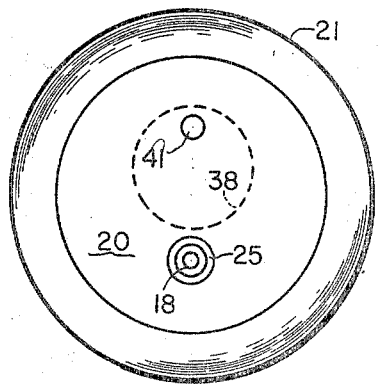
Figure 3:
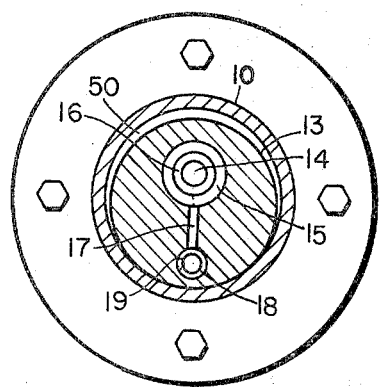
Figure 4:
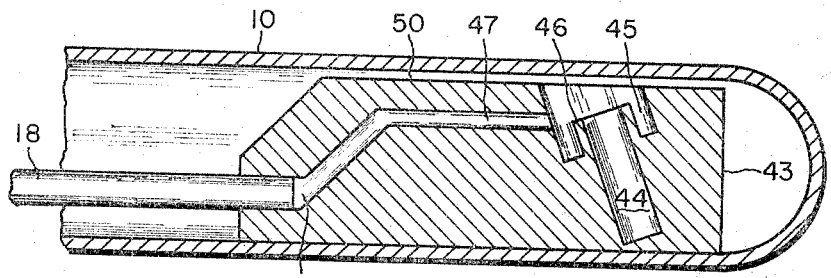

Other objects, advantages and features of this invention will be apparent from a study of the accompanying disclosure, appended claims and drawing, in which:

FIGURE 1 is a sectional side view of a preferred embodiment of this invention;
FIGURE 2 is a view taken on line II—II of FIGURE 1;
FIGURE 3 is a view in section taken on line III—III of FIGURE 1; and
FIGURE 4 is a sectional view of a further embodiment of a resonant cavity oscillator which may be used with this invention.

Referring to the drawings, in FIGURES 1, 2 and 3 there is shown an elongated cylindrical protection tube 10 having a rounded enclosed end 11 and open end 12. Situated within the tube 10 and adjacent the end 11 thereof is a cylindrical member 13 having a cylindrical cavity 14 therein. An annular slot 15 is located near the open end of the cavity 14 and is concentric therewith. An annular projection 16 is formed between the slot and the cavity. A passage 17 is situated in the member 13 near the open end of the cavity so that it makes a small angle, e.g., about 20°, with the plane which passes through the open end of the cavity and is orthogonal with the axis thereof. A small gas conducting tube 18 extends throughout the length of the tube 10 and is inserted in an opening 19 which connects with the passage 17. The outside diameter of the member 13 is slightly smaller than the inside diameter of the tube 10, creating a slight opening 50 therebetween to permit the passage of sound and gas from the cavity 14 toward the open end 12 of the tube 10.

Situated at the open end 12 of the tube 10 is a transducer housing 20 having fins 21 which provide the housing with air cooling. A plurality of holes 22 are equally spaced around the housing to provide a vent for the gas inside the housing and tube 10. The open end 12 of the tube 10 fits into the end of the housing 20 and is secured thereto by tightening a ring 23 against the housing 20 and compressing an O-ring 24 against the tube 10. The tube 18 extends through a hole in the housing 20 which is lined with an insert 25 consisting of a plastic material such as a tetrafluoroethylene resin.

It has been found that the pressure of the gas which is supplied to the resonant cavity oscillator must be precisely regulated in order to give accurate temperature measurement. Shown in FIGURE 1 is one type of pressure regulating mechanism which can be used. Gas from a supply 27 passes through a flow regulator 28 and into a pressure regulator 29. A pressure regulator which may be used in this system is a Moore nullmatic type. The ideal pressure input to the pressure regulator is about 150 p.s.i.g. The regulated pressure will not vary more than ±0.1 p.s.i.g. for a ±25 p.s.i.g. input pressure variation. The flow regulator 28 may be used to adjust the pressure at the input to the regulator when the pressure of the supply is greater than that desired. Gauges 33 may be connected to various points in the pressure regulating system to aid in the making of pressure adjustments. The pressure is adjusted to a value which will give the desired frequency response from the resonant cavity oscillator.

A pressure reducing nozzle 32 is provided to reduce the pressure which exists at the output of the regulator 29, e.g., 80 p.s.i.g., to the pressure required by the resonant cavity oscillator, e.g., about 1.5 p.s.i.g. Even though a constant pressure exists at the output of the pressure regulator 29 the pressure at the output of the pressure reducing nozzle 32 may vary as the ambient temperature in the region of the nozzle varies. To overcome this problem the output of the pressure regulator 29 is coupled to the pressure reducing nozzle 32 by a heat exchanger 31. A constant temperature oven 30 houses both the heat exchanger coil and the pressure reducing nozzle. The temperature at which the oven 30 is maintained should be at least as high as the highest temperature reached by the environment in which the pressure regulating system is used.

A microphone 37 is supported within an annular opening 38 in the housing 20 by an annular mounting member 39 which is made of rubber, plastic or the like. The microphone 37, which is preferably of the dynamic type, may be connected to an amplifier circuit shown at 40 by a coaxial cable 41. The microphone 37 should be capable of operating at ambient temperatures of about 150° C. The output of the amplifier 40 drives a counter 42 which may be gated in a well known manner to give a readout in cycles per second. By referring to a conversion table or a frequency-temperature curve, the counter output reading can be converted to temperature. Since the frequency-temperature curve is almost linear over rather large temperature increments, e.g., about 200°, it is possible to obtain a digital temperature readout by altering the counter circuit to give an output in degrees (degrees centigrade, degrees Fahrenheit, etc.). The temperature reading thus obtained will be fairly accurate over various linear approximated portions of the frequency-temperature curve. The changes in the counter circuit required to give direct temperature readout can be easily made by those skilled in the art.

During operation, the end of the protection tube 10 which contains the cavity is inserted into a high temperature region such as a furnace or the like, the end of the tube 10 which is connected to the transducer housing 20 projecting from such high temperature region. The regulated supply of gas is conducted by the tube 18 and emerges from the orifice of passage 17 where it strikes the corner of the annular projection 16. As the gas travels throughout the length of the tube 18, its temperature approaches that of the region in which he tube 10 is inserted. The sonic vibrations thus produced are amplified in the cavity and travel through the opening 50 and along the length of the tube 10 to the microphone 37 where they are converted to electrical energy. This electrical energy is conducted by the coaxial cable 41 to the amplifier 40, the output of which is coupled to the counter 42. The output reading of the counter is indicative of the temperature in the region of the cavity 14.

A preferred material for use in constructing a resonant cavity oscillator has been alumina. Although alumina can be used for the measurement of temperatures up to 1800° C., it is advisable, due to continuous shrinkage, to limit the maximum operating temperature to about 1700° C. Beryllia, magnesia zirconia, and thoria, are examples of materials which can be used for measuring temperatures in excess of 2000° C. as well as temperatures in the range of 1000° C. to 2000° C. Since the expansion of the resonant cavity oscillator material tends to reduce resolution, a material having a low coefficient of thermal expansion is required. The resonant cavity oscillator material should also exhibit the following properties. It should be a non-ablative material which can be easily cast or machined. Furthermore, it should have a high melting temperature, high oxidation resistance, good thermal shock characteristics, and good thermal conductivity. To obtain the best thermal shock resistance, the entire heated portion of the oscillator should be made of materials with similar coefficients of thermal expansion. In fact, the entire system, i.e., the tubes 10 and 18, the cavity member 13, and the transducer housing 20 may be constructed of the same material.

It is preferred to operate the resonant cavity oscillator at frequencies just above the audible range for the convenience of detection and oscillator design. Frequency of operation is not a critical factor and the oscillator can be designed to operate at higher or lower frequencies. The frequency of operation is determined by the dimensions of the cavity as well as the type of gas used and the pressure thereof.

Any one of a variety of gases may be used, depending on the application and the frequency desired. Some gases cause higher frequencies than others. This fact is dependent upon the specific heat ratio and the gas constant of the particular gas used. As an example, it is noted that for identical cavities the frequencies obtainable with helium are about three times as great as those obtainable with air. Other gases which may be used are nitrogen, hydrogen, argon, neon, and the like. Although the lighter gases such as helium and hydrogen give the best results, a temperature sensor using air as the gas has been continuously and satisfactorily operated for a period of months. Obviously, caution must be exercised when hydrogen is used.

The position of the cavity opening within the elongated tube 10 is not critical. In the embodiment illustrated by FIGURE 4 the opening of the resonant cavity faces a sidewall of the tube 10. In this embodiment a cavity 44 is located within the member 43 in such a manner that the axis of the cavity makes an angle of about 70° with respect to the axis of the tube 10. An annular slot 45 around the cavity opening creates an annular projection 46 at the opening of the cavity. A passage 47 is located adjacent the annular slot 45, the axis of the passage 47 making an angle of about 20° with the plane that passes through the end of the cavity 44. The gas supply tube 18 is inserted in an opening 49 in the member 43 which connects to the passage 47. A slight opening 50 exists between the cylindrical member 43 and the tube 10 to permit the passage of sound and gas toward the open end of the tube 10.

There is a delay in the response of the resonant cavity oscillator to a change in temperature which is proportional to the physical mass of the resonant cavity oscillator. For example, one of the initially constructed sensors having an overall diameter of 1.5 inches exhibited a lag of about 30 seconds to an incremental temperature change. In furnaces having large heat transfer capacities, such as glass and steel furnaces, this relatively large resonant cavity oscillator can be used effectively. However, in small furnaces, such as diffusion furnaces, a large resonant cavity oscillator would be impractical. For some applications it may be desirable to reduce the size of the resonant cavity oscillator to provide a temperature sensor which can be used in small furnaces as well as one which has a quicker response time. Such a temperature sensor has been constructed having an overall diameter of about one-half inch, making it comparable in size to a thermocouple probe.

Tests were performed on a temperature sensor constructed in accordance with this invention which used air as the gas. Data was taken in a temperature range between 1300° and 1700° C., and temperature-frequency graphs were plotted each time the temperature was cycled through this range. The repeatability was ±2° C. and the resolution was 2.3 cycles/second/degree C. over the entire curve. In the range between 1300° and 1700° C. the temperature-frequency curve was almost linear. In fact, between 1000° and 1700° C. there was only about 0.2 cycles/second/degree C. change in slope. In another test in which helium was used as the driving gas, a linear response was obtained over a 200° C. temperature range with a slope of 7.5 cycles per degree C. Further tests with argon as the driving gas resulted in a resolution of 3 cycles per degree C. from 1000° to 1650° C. The resolution of the sensor shown in FIGURE 4 is about 10 cycles/second/degree C.

Various modifications can be made without departing from the basic concept of this invention. The embodiment described herein is meant to be exemplary of this invention and is not intended to be a limitation thereon. For example, any one of many well known pressure regulating systems could be used to control the pressure of the gas supplied to the resonant cavity oscillator. Also, other utilization devices could be connected to the output of the microphone. In addition, if coupling means other than the coaxial cable 41 were used, or if a microphone other than the dynamic microphone 37 were used, it may become necessary to use an impedance transformer to match the microphone with the coupling means.

What is claimed is:

1. A system for determining the temperature of a high temperature region comprising: means for conducting a gas through said high temperature region, and thereby raising the temperature of said gas to that of said high temperature region, means associated with said gas conducting means and responsive to said gas for producing vibrations, the frequency of which is related to the temperature of said gas, transducer means for converting said vibrations into an electrical signal, and means at the input of said gas conducting means for maintaining said gas at a substantially constant pressure.

2. A temperature determining system in accordance with claim 1 which further comprises means coupled to the output of said transducer means for providing a visual indication of the temperature of said high temperature region.

3. A temperature determining system in accordance with claim 1 wherein said means for maintaining said gas at a constant pressure comprises a pressure regulator, a heat exchange coil and a restriction nozzle, all coupled in series, and means for maintaining said heat exchange coil and said nozzle at a constant temperature.

4. A temperature determining system in accordance with claim 1 wherein said transducer means is spaced from said means for producing vibrations so that said transducer means is located outside of said high temperature region.

5. A temperature determining system in accordance with claim 1 wherein said means for producing vibrations comprises a resonant cavity, and means to direct said gas toward said cavity.

6. A temperature determining system in accordance with claim 5 which further comprises an elongated protection tube of high temperature, low thermal expansion material, said tube being closed at one end, said resonant cavity being situated in said tube adjacent the closed end thereof, and said transducer means being located adjacent the end of said tube opposite that in which said resonant cavity is situated.

7. A temperature determining system in accordance with claim 6 wherein the axis of said resonant cavity is parallel to the axis of said tube.

8. A temperature determining system in accordance with claim 6 wherein the opening of said resonant cavity faces a wall of said tube, an unobstructed path existing between said cavity opening and said transducer means.

9. A temperature determining system in accordance with claim 1 which further comprises an elongated protection tube, one end thereof being adapted to extend into said high temperature region, said means for producing vibrations being disposed within said one end of said tube, and said gas conducting means extending along the length of said tube.

10. A temperature determining system in accordance with claim 9 wherein said transducer means is located at the end of said tube opposite said first end.

References Cited

UNITED STATES PATENTS

| 2,582,232 | 1/1952 | Cesaro et al. | 73—339 |
| 3,214,976 | 11/1965 | Miller | 73—339 |
| 3,214,977 | 11/1965 | Apfel | 73—339 |
| 3,299,707 | 1/1967 | Noel | 73—339 |

LOUIS R. PRINCE, *Primary Examiner.*

FREDERICK SHOON, *Assistant Examiner.*